(No Model.) 2 Sheets—Sheet 1.

H. NICHOLSON.
COFFEE POT.

No. 555,394. Patented Feb. 25, 1896.

WITNESSES:

INVENTOR
Herbert Nicholson
BY
ATTORNEYS.

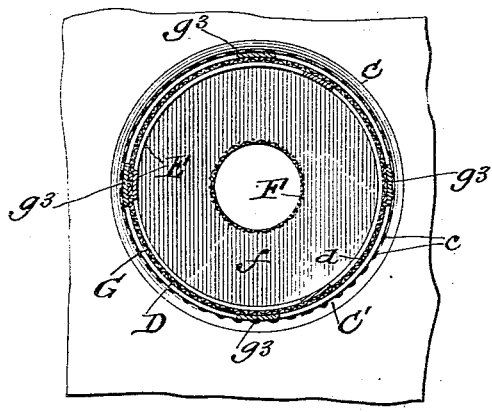
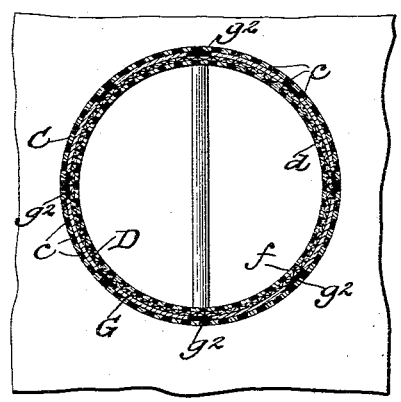
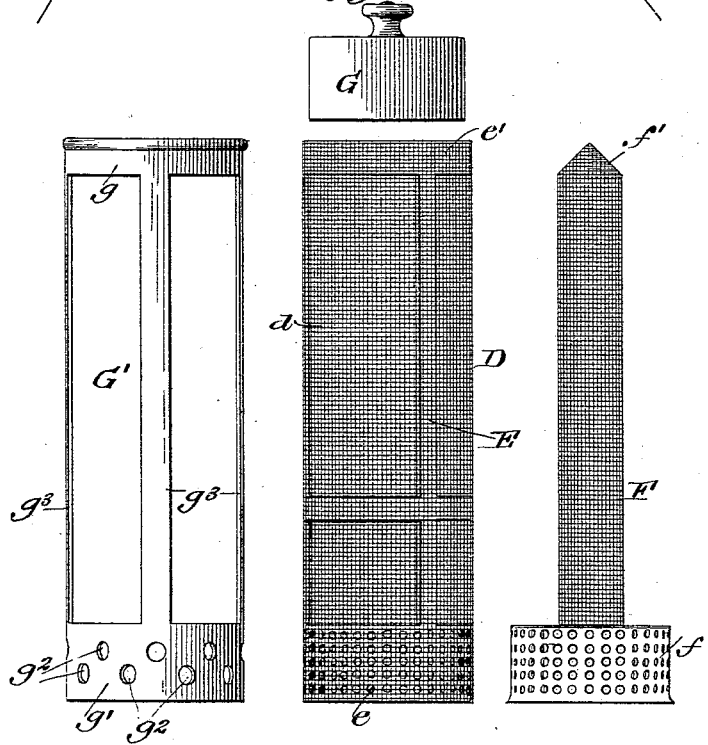

UNITED STATES PATENT OFFICE.

HERBERT NICHOLSON, OF RED LODGE, MONTANA.

COFFEE-POT.

SPECIFICATION forming part of Letters Patent No. 555,394, dated February 25, 1896.

Application filed May 1, 1895. Serial No. 547,798. (No model.)

*To all whom it may concern:*

Be it known that I, HERBERT NICHOLSON, residing at Red Lodge, in the county of Park and State of Montana, have invented a new and Improved Coffee-Pot, of which the following is a specification.

My invention relates to certain improvements in coffee-pots, and it primarily has for its object to provide a culinary utensil of this character of a simple and inexpensive character, and which will effectively serve for its intended purposes.

My invention also has for its object to provide a holder which can be detachably connected with the pot and which acts as a receiver for the coffee or tea, and which can be easily removed from the pot with coffee-grounds or tea-dregs without making it necessary to empty the pot.

Among other objects my invention seeks to provide a holder which will hold the coffee or tea within the pot in such a manner that while the same will become thoroughly soaked the greatest flavor and strength will be obtained therefrom, in which the holder can be removed from the pot without opening the lid proper, and which has the holder and the screening devices so arranged that they can be quickly removed from the pot when it is desired to scour the same.

The invention consists in novel features of construction and peculiar combination of parts, such as will be first described in detail, and then be specifically pointed out in the appended claims, reference being had to the accompanying drawings, in which—

Figure 1:
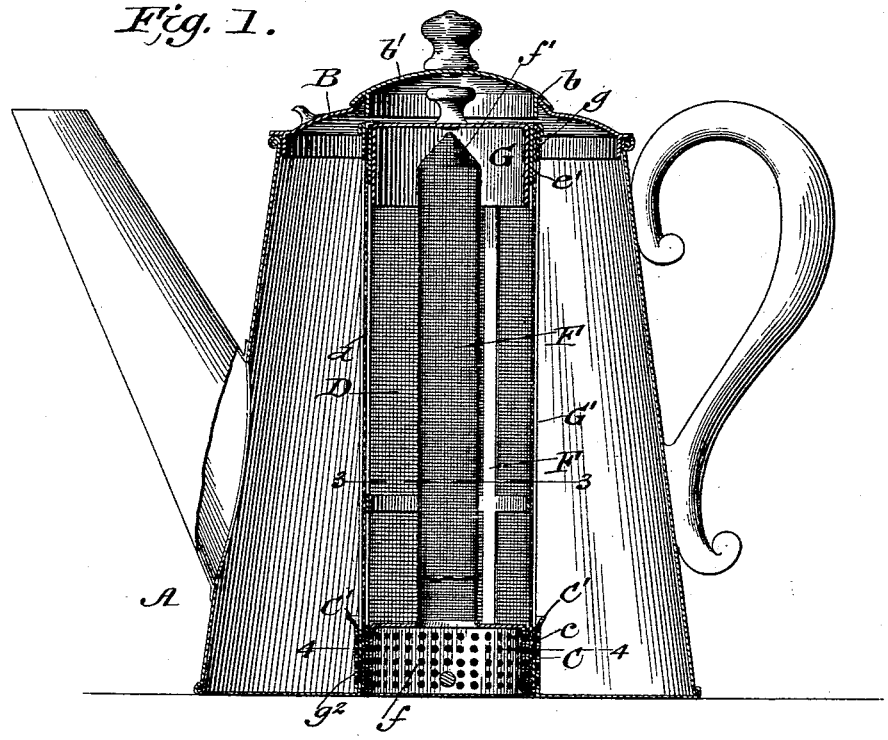
Figure 2:
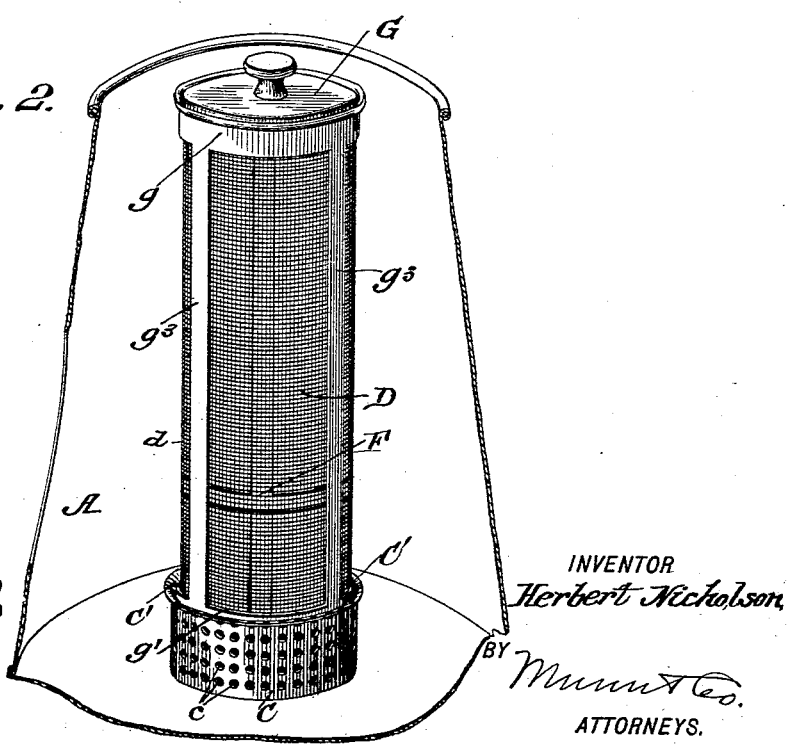

Figure 1 is a vertical longitudinal section of my improved cooking utensil. Fig. 2 is a perspective view of a portion of the interior of the pot and the holder and screening devices. Fig. 3 is a horizontal section taken on the line 3 3 of Fig. 1. Fig. 4 is a horizontal section taken on the line 4 4 of Fig. 1, and Fig. 5 illustrates the several parts of the holder and separating devices detached.

Referring to the accompanying drawings, A indicates the pot, which is preferably of the shape shown, and B the lid, which in the structure shown has a central opening $b$, covered by a supplemental lid $b'$, for a purpose presently explained.

To the bottom of the pot, centrally thereof, is secured a socket or supporting-rim C, which has its sides perforated, as at $c$, and its upper end or rim flared, as at $C'$, such member C forming a socket to receive and support the holder, the flaring end permitting a free and positive engagement of the lower end of the said holder when the same is inserted in the pot. This holder comprises an outer hollow cylindrical tube, D, made of wire or copper gauze $d$ reinforced by a metallic skeleton frame E, the lower end of which terminates in a perforated annular rim $e$, which forms a guide portion to receive the base $f$ of the inner tube, F, while the upper end has a non-perforated rim $e'$ which receives the cap G, as most clearly shown in Fig. 1.

The inner tube, F, consists of a perforated or screen-like member, the body of which is of a much smaller diameter than the outer tube or holder and terminates in a cone-like end $f'$, the lower end of such body being soldered or otherwise secured to the base $f$, which has its side walls perforated, and which is of a size to snugly fit the perforated lower end of the outer cylinder, D.

$G'$ indicates an outer cage formed of sheet metal having an upper rim, $g$, and a lower rim, $g'$, which is perforated, as at $g^2$, and vertical strips $g^3$, which connect the rims, as shown, such cage serving as a reinforce or support for the screen-like holder D. This cage $G'$, it should be stated, is of a diameter somewhat greater than the diameter of the supplemental opening in the lid member, as is most clearly shown in Fig. 1, for a purpose presently described.

So far as described it will be readily seen that by forming the cage, the holder and the seat or support at the bottom of the pot, as also the bottom of the internal tube, with perforations the water has a thorough passage to the center tube or strainer. Furthermore by making the holder and the outside cage therefor adjustable—that is, of a rigid lower member and a removable member—makes it very convenient, as the holder and its cage can be quickly removed when it is desired to clean or scour the pot.

The cage or outer frame, $G'$, is so constructed of open-work that it can be easily cleaned and also to allow for a free circulation of water and steam through the strainer and holder.

Again by providing a small or supplemental hole in the top (the lid) of a diameter slightly larger than the holder, but smaller than its surrounding cage, the strainer and holder can be quickly drawn out of the pot without having to lift the larger or principal lid, the small lid being capable of being taken off or put on again in an instant, and consequently practically no steam or evaporation will escape from the pot during the removal or insertion of the strainer.

Having thus described my invention, what I claim, and desire to secure by Letters Patent, is—

1. A coffee or tea pot having a perforated receiving portion, or support in the bottom thereof, a tubular holder formed of wire-gauze and detachably held in the said support, and an internal strainer-tube located in the said holder, said strainer having its lower end connected to a perforated base portion, the said holder being open at its upper end, and a cap for closing said opening, all arranged substantially as shown and described.

2. An improved coffee-pot having a strainer-supporting portion in the bottom thereof, strainer device formed of a tubular screen-body and adapted to be held in the said support, an outer cage for supporting the said screen-body, the lower end of said cage terminating in a perforated rim which fits into the said support, and an inner strainer-tube located within the said holder and securely connected at its lower end to a base portion, said base having its sides perforated and fitted into the lower end of said screen-body, whereby to hold the screen in an upright position, all arranged substantially as shown and described.

3. An improved coffee or tea pot having a supporting portion, and a straining device detachably held in such support, comprising a screen-like holder having a removable cap, and a strainer or fluid-disseminating tube held detachably within the holder substantially as shown and described.

4. As an improvement in coffee or tea pots, the combination with the pot having a socket at the lower end, and an open-framework tube G' held therein, of a tubular member formed of a screen-like body detachably held in the said tube G' and a straining-tube, having a base portion of a diameter to snugly fit the holder all arranged substantially as shown and for the purposes described.

5. As an improvement in coffee-pots the combination with the pot having a socket in the bottom and a vertical support detachably held therein of the screen-like tubular holder having a removable cap-piece and the strainer-tube held in the holder having a base of a diameter to snugly fit the holder, all arranged substantially as shown and described.

HERBERT NICHOLSON.

Witnesses:
FERDINAND FREIMAN,
GEO. W. PIERSON.